United States Patent
Koifman et al.

(10) Patent No.: US 11,899,115 B1
(45) Date of Patent: Feb. 13, 2024

(54) CHIRPED ILLUMINATION LIDAR SYSTEM

(71) Applicant: Apple Inc, Cupertino, CA (US)

(72) Inventors: Vladimir Koifman, Rishon Lezion (IL); Tiberiu Carol Galambos, Binyamina (IL)

(73) Assignee: APPLE INC., Cupertino, CA (US)

( * ) Notice: Subject to any disclaimer, the term of this patent is extended or adjusted under 35 U.S.C. 154(b) by 724 days.

(21) Appl. No.: 16/949,835

(22) Filed: Nov. 16, 2020

(51) Int. Cl.
*G01S 17/00* (2020.01)
*G01S 17/894* (2020.01)
*G01S 7/4865* (2020.01)
*G01S 7/4863* (2020.01)
*G01S 7/484* (2006.01)

(52) U.S. Cl.
CPC ............ *G01S 17/894* (2020.01); *G01S 7/484* (2013.01); *G01S 7/4863* (2013.01); *G01S 7/4865* (2013.01)

(58) Field of Classification Search
USPC ........................................................ 356/5.01
See application file for complete search history.

(56) References Cited

U.S. PATENT DOCUMENTS

| | | | |
|---|---|---|---|
| 10,126,411 B2* | 11/2018 | Gilliland | G01S 7/4817 |
| 11,086,017 B2 | 8/2021 | Koifman et al. | |
| 11,175,384 B2* | 11/2021 | Gilliland | G01S 7/4817 |
| 2017/0372602 A1* | 12/2017 | Gilliland | G01S 17/86 |
| 2018/0278868 A1 | 9/2018 | Dawson et al. | |
| 2018/0372873 A1* | 12/2018 | Koifman | G01S 17/10 |
| 2019/0056498 A1 | 2/2019 | Sonn et al. | |

(Continued)

FOREIGN PATENT DOCUMENTS

WO    WO-2016149118 A1 *  9/2016  ........... G01S 17/894

OTHER PUBLICATIONS

Plank et al., "High Performance Indoor Positioning and Pose Estimation with Time-of-Flight 3D Imaging," Conference Paper, 2017 International Conference on Indoor Positioning and Indoor Navigation (IPIN), pp. 1-9, year 2017.

(Continued)

*Primary Examiner* — James R Hulka
(74) *Attorney, Agent, or Firm* — Kligler & Associates Patent Attorneys Ltd.

(57) ABSTRACT

A chirped illumination LIDAR system having a transmitter that may include a pulsed radiation illuminator that is followed by a beam forming optics. The transmitter may be configured to output, during each illumination period of a sub-group of illumination periods, a first plurality of radiation pulses that form a decimated chirp sequence of radiation pulses; the decimated chirp sequence is a sparse representation of a chirp signal. A receiver of the system may be configured to receive, during each reception period of a sub-group of reception periods, one or more received light pulses from one or more objects that were illuminated by the one or more radiation pulses transmitted during each illumination period. The receiver may include multiple radiations sensing elements, multiple shutter circuits, and multiple processing circuits for converting the one or more received light pulses to output information; wherein the multiple shutter circuits may be configured to apply a shutter function on intermediate signals, the intermediate signals represent radiation sensed by the multiple radiations sensing elements, wherein the shutter function represents the chirp signal.

20 Claims, 10 Drawing Sheets

(56) References Cited

U.S. PATENT DOCUMENTS

2019/0101626 A1* 4/2019 Gilliland ............... G01S 7/4817
2022/0035006 A1* 2/2022 Gilliland ............... G01S 17/894

OTHER PUBLICATIONS

Kadambi et al., "Rethinking Machine Vision Time of Flight with GHz Heterodyning," IEEE Access, vol. 5, pp. 1-13, year 2017.
Lips Coproration, "LIPSedge™ DL—Best-in-One 3D Time-of-Flight Camera", pp. 1-2, Sep. 17, 2019 (downloaded from https://www.lips-hci.com/lipsedge-dl).

* cited by examiner

CHIRPED ILLUMINATION LIDAR SYSTEM

BACKGROUND

LIDAR systems are key components in future self-driving automotive applications. The purpose of the system is to create a 3D model of the environment. This is achieved by illuminating the scene with an infrared pulsed laser and measuring the time in which the reflection returns from the different objects (time of flight).

There are various types of LIDAR systems, depending on whether the scene is scanned point by point (scanning LIDAR system) or the illumination is applied simultaneously to the whole scene (flash LIDAR system) or anything in between (for example scanning with a linear vector).

One of the key limitations of LIDAR system is caused by the ambient light that basically acts as noise for the imaging system. In order to overcome this issue, powerful illuminators are used but they have to be designed so as to conform to regulations related to eye safety.

Another problem that should be addressed by a LIDAR system is multi-path reflections that may introduce errors in the detection of objects. Multi-path reflections are light emitted by the transmitter (illuminator) reaches the receiver (imager) simultaneously on several trajectories.

The calibration of LIDAR systems is very complex and contributes to the cost of such system.

Yet a further problem that should be addressed by a LIDAR system is how to coexist with other LIDAR systems—as one LIDAR system may receive reflections from radiation transmitted by another LIDAR system.

SUMMARY

There may be provided a LIDAR system that may include a transmitter and a receiver.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

A chirp signal is a sequence of radiation pulses and/or detector shutter pulses where the time gap between adjacent pulses and/or pulse width change over time. The time gaps and/or pulse widths may change in various manners—for example in a continuous manner, in a stepped manner or in any other manner. Sometimes it's called amplitude modulated chirp signal.

A decimated chirp sequence of radiation pulses is a sparse representation of an amplitude modulated chirp signal. The amplitude modulated chirp differs from a coherent optical chirp in which the frequency of the light signal changes during the chirp duration.

The timing range associated with time gaps and/or pulse duration may be in the range of micro-seconds to pico-seconds—orders of magnitude below a frequency of an optical carrier of the decimated chirp sequence of radiation pulses.

The method that uses the decimated chirp sequence of radiation pulses is a non-coherent method. Any reference to light may represent the power and not phase of the light signal. The light source may be coherent, such as laser-based, or non-coherent, for example, LED-based.

A reduction of the influence of the ambient light can be attempted by several ways:
  a. Spectral filter at the receiver (to pass just the wavelengths in the spectral vicinity of the used LASER)
  b. Spatially non-uniform illumination to concentrate the light power of the LASER on only a portion of the scene.
  c. Spatial non-uniformity of the receiver (imager) sensitivity that adapts to the illumination pattern Other issues that need to be addressed by the system are:
  a. Coexistence of several LIDAR systems in the same scene.
  b. Simplified system calibration procedure c. Adverse atmospheric conditions such as rain, fog, snow.

d. Specular reflections that can deflect the laser beam (in which case no reflection is detected) or return the laser beam to the receiver at high intensity causing saturation.

There is provided a LIDAR system that uses a patterned illuminator and a specialized CMOS imager array.

Figure 1:
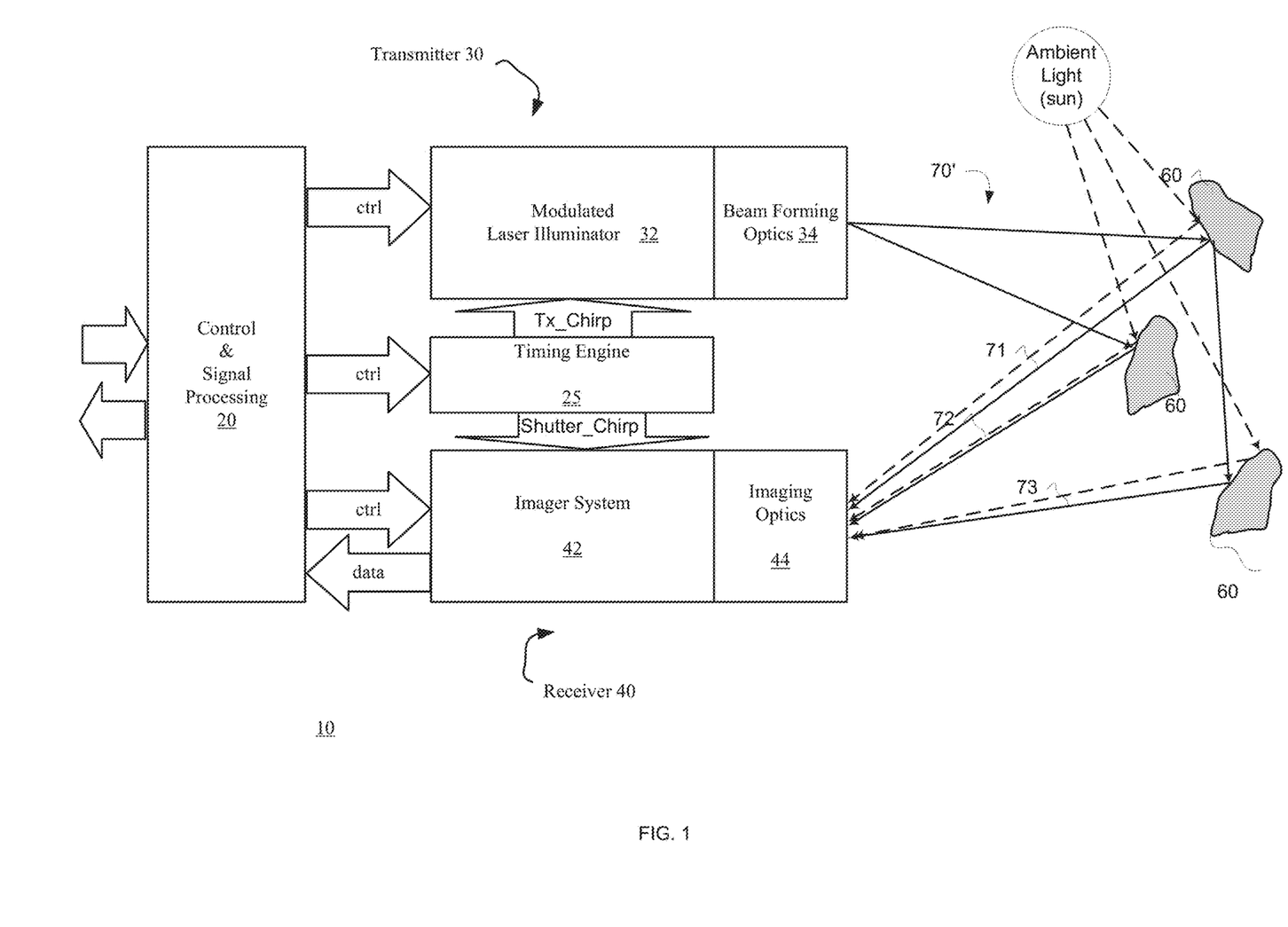
FIG. 1 is an example of a LIDAR system.

FIG. 1 illustrates an example of LIDAR system 10.

LIDAR system 10 include a control and signal processing unit 20, transmitter 30 and receiver 40.

The control and signal processing unit 20 coordinates the operation of the LIDAR system and computes the scene model that is delivered in the form of a point cloud or in any other manner.

The control and signal processing unit 20 may include a separate controller for controlling the LIDAR system and a separate signal processor for performing signal processing—but this is not necessarily so. The control and signal processing unit may include one or more integrated circuits.

The transmitter is configured to illuminate a space (or scene) in front of the LIDAR system with a light pattern. The light pattern may be formed from one or more laser pulses from the pulsed laser illuminator 32 and shaped by the beam forming optics 34.

The scene is illuminated by the pulsed laser. The beam forming optics take care of generating the desired spatial distribution of the illuminant power.

The receiver 40 includes imaging optics 44 that are followed by an imager system 42.

The imaging optics 42 projects the scene on the imaging system 42 that besides the angular position (determined by the location of a pixel in the imaging array) acquires depth information too by measuring the delay between the transmitted laser pulses 70' and the received light pulses 71, 72 and 73.

The coordination of the transmitted pulses and receiver aperture slots is performed by the timing engine 25.

FIG. 1 also illustrates a timing engine 25 for sending shutter signals to the receiver and sending decimated chirp sequence triggering signals for generating the decimated chirp sequence of radiation pulses. These are control signals. A direct digital synthesis approach may be applied.

Commands and/or processed data may be exchanged between the control and signal processing unit 20 and another device or system. Any other signal may be exchanged between LIDAR system and other systems and/or devices.

In FIG. 1 three objects 60 are illuminated by the pattern. There may be more than one object, no objects and any other combination of objects.

Figure 2:
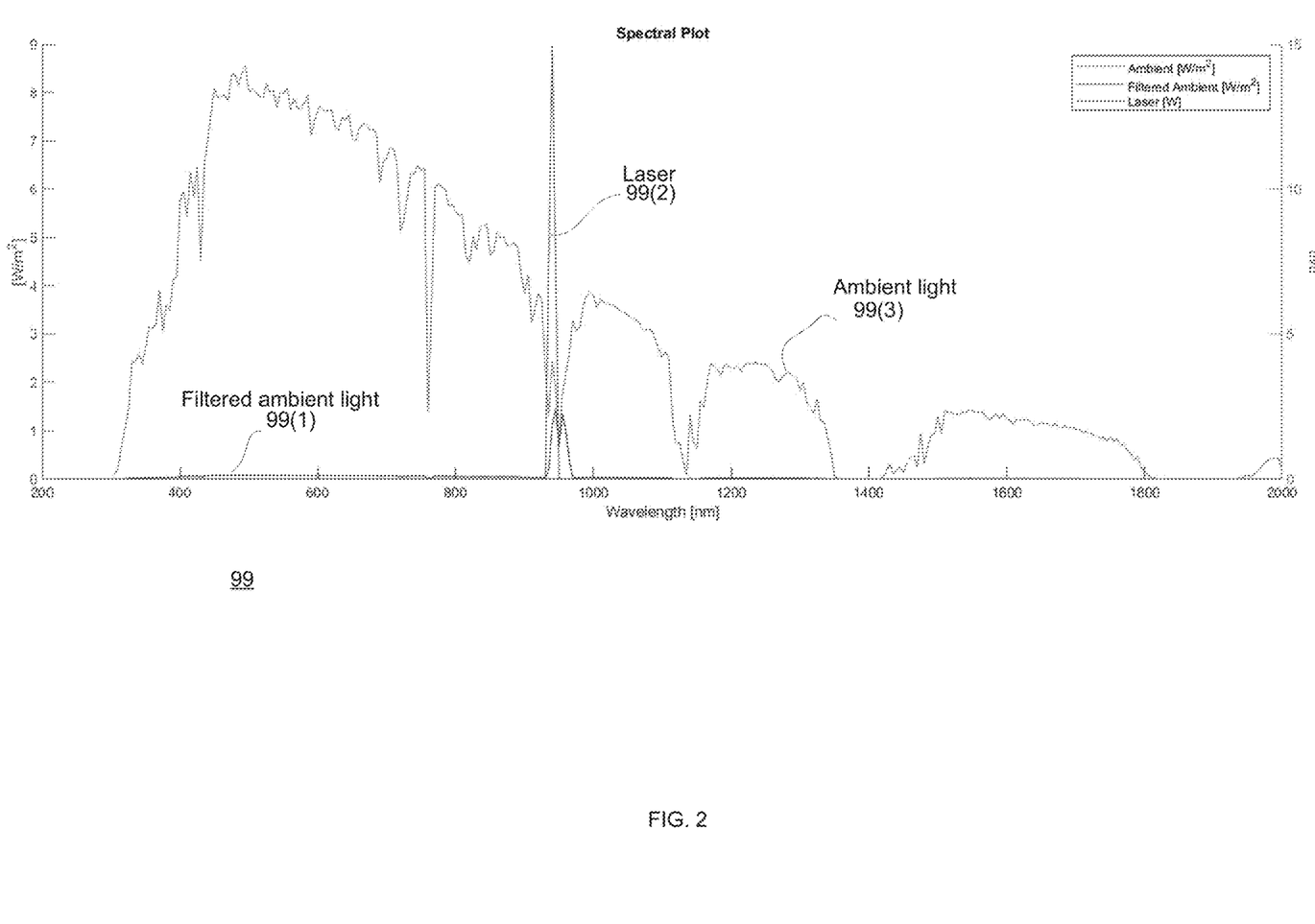
FIG. 2 is an example of a spectrum.

The spectrum of ambient light (sunlight) 99(1), filtered ambient light 99(2) and laser 99(3) is presented in FIG. 2. The laser may have a finite band-width.

The LIDAR system may transmit light pulses at a wavelength of 940 nm in order to benefit from the dip caused by atmospheric absorption. The receiver may include a receive filter that has a pass-band that is 20 nm wide (centered on 940 nm) and a 40 dB attenuation outside the passband.

Other wavelengths and other bandwidths can be used by the LIDAR system.

Figure 3:
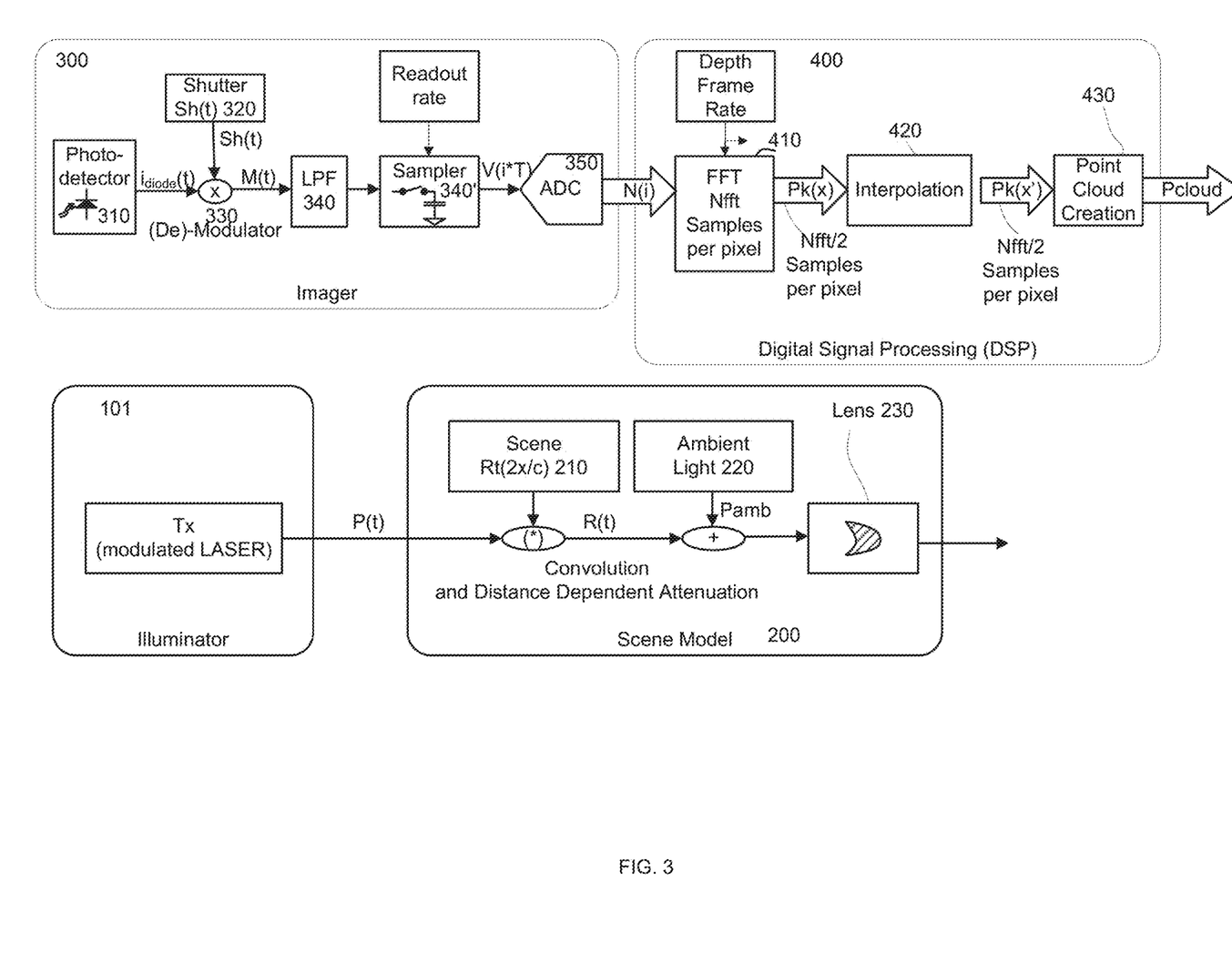
FIG. 3 is an example of some parts of the a LIDAR system.

The signal flow of the model used to describe the operation of the LIDAR system is shown in FIG. 3. A modulated light source 101 illuminates the scene. The scene model 200 convolves the transmitted signal with a pattern that contains the several reflections and possible distributed scattering effects 210 adds the ambient light 220 and takes care of the distance dependent attenuation due to propagation. A Lambertian model is assumed for the reflections and a simple lens model is used for the imaging optics 230.

The imager model 300 describes the photodetector (quantum efficiency) and the readout circuitry including the shutter circuit 320, de-modulator 330, accumulation/sampling/filtering 340 and ADC (quantizer) 350. Besides the simple readout shown here, different implementations are possible as will be shown below.

The digital signal processing unit (DSP) 400 contains the FFT calculation that take Nfft samples from the output of the ADC and calculates Nfft/2 (depending on implementation, magnitude or complex) samples (the spectrum being symmetric, the half of the samples contain all of the information), interpolation block 420 that increases the accuracy of the depth reading and point cloud creation algorithm 430.

The basic principle of the LIDAR system operation is easiest to be described for the case of continuous wave sine chirp. For this case the laser emits a continuous sine wave modulated chirp (that in practice would require an analog modulation that tends to be both expensive and available for lasers that are lower power than what the present application requires).

The laser in this case emits an optical power:

$$P_{laser}(t) = P_{DC} + P_a \sin(\varphi_0 + 2\pi f_0 t + \pi f_{slp} t^2) \quad (1)$$

$P_{DC}$ and $P_a$ are the DC and amplitude of the power, $f_0$ is the initial phase of the chirp, $f_0$ is the start frequency of the chirp, and $f_{slp} = df/dt$ is the frequency slope of the chirp.

We assume a setup with a single target object with reflectivity R placed at distance x and for simplicity we combine the effect of light square law, imaging optics and quantum efficiency into a coefficient Cf1(x) then the output of the photodetector (before the de-modulator) is (c is the speed of light):

$$i_{diode}(t) = R\, C_{f1}(x) P_{laser}\left(t - \frac{2x}{c}\right) = \quad (2)$$

$$R\, C_{f1}(x) P_{DC} + R\, C_{f1}(x) P_a \sin\left[\varphi_0 + 2\pi f_0\left(t - \frac{2x}{c}\right) + \pi f_{slp}\left(t - \frac{2x}{c}\right)^2\right]$$

We model the de-modulator as a multiplier with the shutter function $$Sh(t) = \sin[\varphi_{0sh} + 2\pi(f_0 + f_{shift})t + \pi f_{slp} t^2] \quad (3)$$

The shutter function is shifted in frequency by $f_{shift}$ relative to the chirp transmitted by the laser but has the same frequency slope $f_{slp}$.

The modulator output is then:

$$M(t) = Sh(t) i_{diode}(t) = = \underbrace{R\, C_{f1}(x) P_{DC} Sh(t)}_{HF\ chirp} + \quad (4)$$

-continued $$1/2R\, C_{f1}(x)P_a\cos\left[\underbrace{\varphi_{0sh} - \varphi_0 + 2\pi f_0 \frac{2x}{c} - \pi f_{slp}\left(\frac{2x}{c}\right)^2}_{\varphi_{M-}} + 2\pi\underbrace{\left(f_{shift} + f_{slp}\frac{2x}{c}\right)}_{f_{rx}}t\right] --$$

LF component $$1/2R\, C_{f1}(x)P_a\cos\left[\underbrace{\varphi_{0sh} + \varphi_0 - 2\pi f_0 \frac{2x}{c} + \pi f_{slp}\left(\frac{2x}{c}\right)^2}_{\varphi_{M+}} + 2\pi\left(2f_0 + f_{shift} - f_{slp}\frac{2x}{c}\right)t + 2\pi f_{slp}t^2\right]$$

HF chirp component

The LPF will leave only the low frequency LF component (a sine wave in this case) that we will appear as a component at $f_{rx}$ in the spectrum. The measurement of the depth estimate is then:

$$\hat{x} = \frac{(f_{rx} - f_{shift})c}{2f_{slp}} \quad (5)$$

The LF component of the modulator output is sampled $N_{fft}$ times at a sampling period $T_{readout}$. This means that the FFT spectrum covers frequencies up to $f_{max}$ given by:

$$f_{max} = \frac{1}{2T_{readout}} \quad (6)$$

This means the depth range of the LIDAR system is:

$$x_{range} = \frac{(f_{max} - f_{shift})c}{2f_{slp}} = \frac{(1 - 2T_{readout}f_{shift})c}{4T_{readout}f_{slp}} \quad (7)$$

The depth resolution of the LIDAR system is limited by the FFT bins to:

$$\Delta x = \frac{c}{2N_{fft}T_{readout}f_{slp}} \quad (8)$$

The accuracy of the distance readings of the LIDAR system can be improved by interpolation techniques. When frx does not fall in the center of a FFT bin, side lobes of the convolution with the sinc function related to the FFT window will be present. In that case, a better estimate of the frequency can be calculated by looking at the amplitudes of the neighbor bins (above and below the bin of the peak) as follows:

$$\hat{x} = x(k) + \begin{cases} \Delta x * \dfrac{Pk(k+1)}{Pk(k+1) + Pk(k)} & \text{for } Pk(k+1) > Pk(k-1) \\ \Delta x * \dfrac{-Pk(k-1)}{Pk(k-1) + Pk(k)} & \text{for } Pk(k+1) \le Pk(k-1) \end{cases} \quad (9)$$

Where x(k) are the centers of the FFT bins on the distance axis and Pk(k) are the magnitudes of the FFT output (left on a linear scale, not dB).

Calibration of a LIDAR system can be a cumbersome and costly operation. The root of the problem relies in the fact that the measured time difference will inevitably contain besides the desired time of flight component 2x/c an (unwanted and presumably temperature, process and time variable component related to different circuit and laser delays). However, for the presented approach, having one known peak in the response is enough to calibrate the depth measurement.

The frequency-distance equation including the delay we need to calibrate out is:

$$f_{rx} = f_{shift} + f_{slp}\left(\frac{2x}{c} + td_{circuit}\right) \quad (10)$$

If in the set of received reflections we have one that comes from the known distance $x_0$, we can calculate $td_{circuit}$ and account for it:

$$td_{circuit} = \frac{f_{rx} - f_{shift}}{f_{slp}} - \frac{2x_0}{c} \quad (11)$$

This known response peak can be provided by the inevitable reflection from the protective cover of the device or else can be provided by a dedicated optical path (for example a fiber or other wave guide) with sufficient attenuation to provide a reasonably small response. The distance values of all the reflections detected by the LIDAR system can then be adjusted (by linear shift) to the known response peak.

In case the response contains unwanted reflections (a dirty window or similar) these can be effectively eliminated by operating the shutter only in the regions that correspond to the wanted distance range one desires to image.

The principle of operation was described based on continuous sine wave chirps. In practice other options are possible as described in the following sections. The chirp signal might be a stepped chirp in which the frequency of the signals is changed in a discrete stepped fashion. The suggested chirp signal may be (besides the sinusoidal one) a square wave chirp (removing the requirement for an analog laser modulator), a pulsed chirp (that reduces the duty-cycle of the pulses relative to the square wave chirp and permits the use of pulsed lasers) and decimated version of a chirp signal such as but not limited to a continuous pulse chirp or the stepped pulse chirp.

Figure 4:
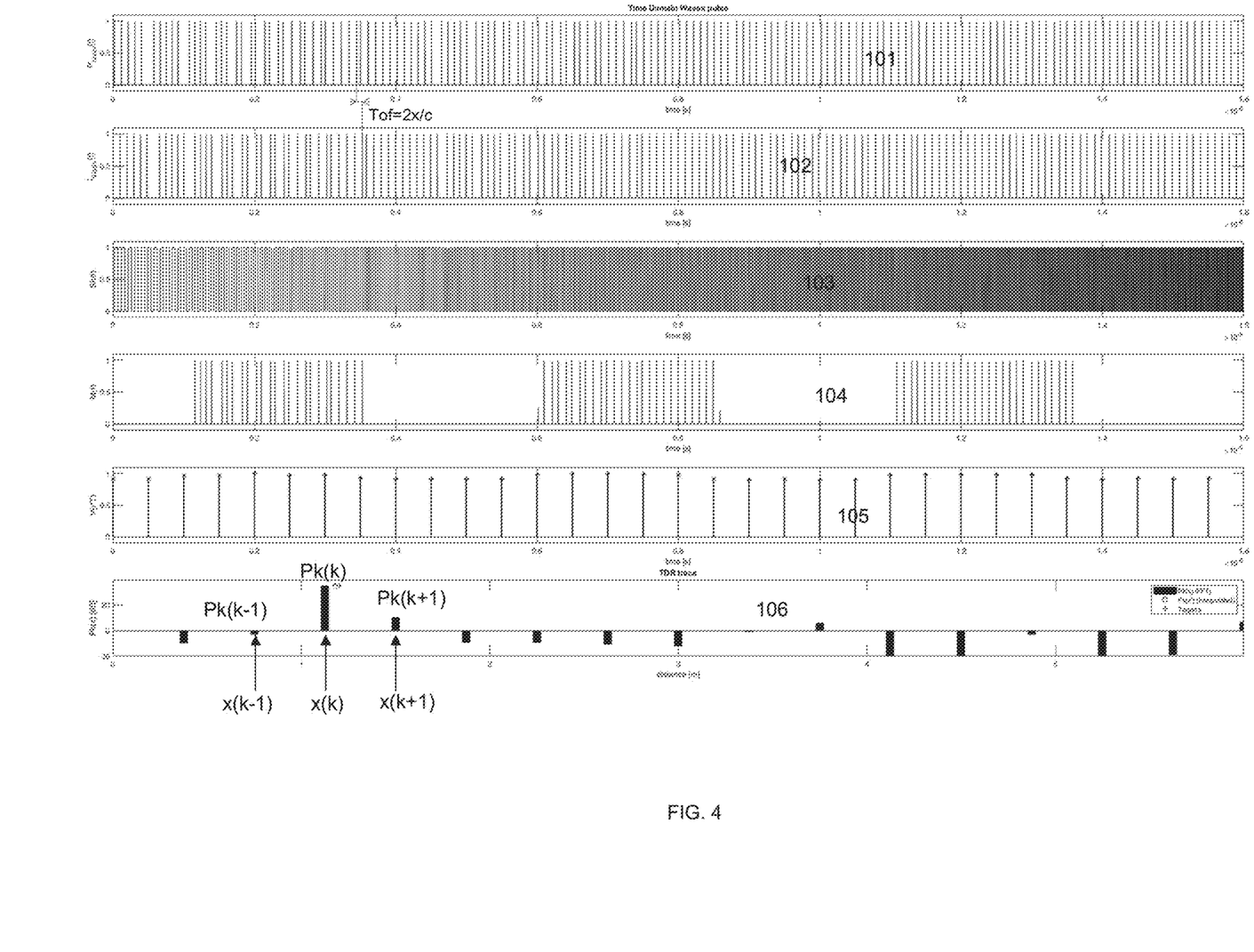
FIG. 4 is an example of waveforms related to the operation of a LIDAR system.

In order to accommodate the repetition rate limitation of pulsed lasers and also to permit operation with constant average emitted power (this can be an advantage for eye safety too), we start from the continuous pulse chirp but we transmit only part of the pulses so that there should be no more than 1 pulse in each Trep time period (where Trep is the desired maximum repetition rate of the laser pulses). As the imager we use samples only at readout rate, the decimation of the pulses has no significant effect on the functioning of the LIDAR system. If we look at the principle of operation described, the high frequency components of the modulator output though they are at a lower frequency than in the case of the original (not decimated) chirp, they are still high enough to be rejected by the low pass filter (that as we will see can be an integrator). The waveforms 101, 102, 103, 104, 105 and 106 for the decimated continuous pulse chirp are shown in FIG. 4.

Waveform 101 is the transmitted laser power Plaser(t) (optical signal)

Waveform 102 is the photodiode current idiode(t) (electrical signal). In case of a single target, this signal reproduces the laser signal delayed by the time of flight (Tof).

Waveform 103 is the shutter signal Sh(t) in this case a continuous square chirp.

Waveform 104 is the output of the demodulator M(t) (the diode current multiplied by the shutter signal).

Waveform 105 is the readout signal V(i) that after the quantizing by the ADC provides the digital samples N(i).

Waveform 106 is the FFT block output Pk(i) (magnitude of the FFT, plotted on a log scale [dB]) and on the horizontal scale it represents the distance.

As an additional option, the shutter signal can in principle be decimated too, but care has to be taken in that case to synchronize the decimation of the laser pulses with the decimation of the shutter pulses. This might relax somewhat the requirements for the shutter maximum frequency but it does not relax the timing accuracy required by the shutter The architecture of the imager system is presented in FIG. 5.

Figure 5:
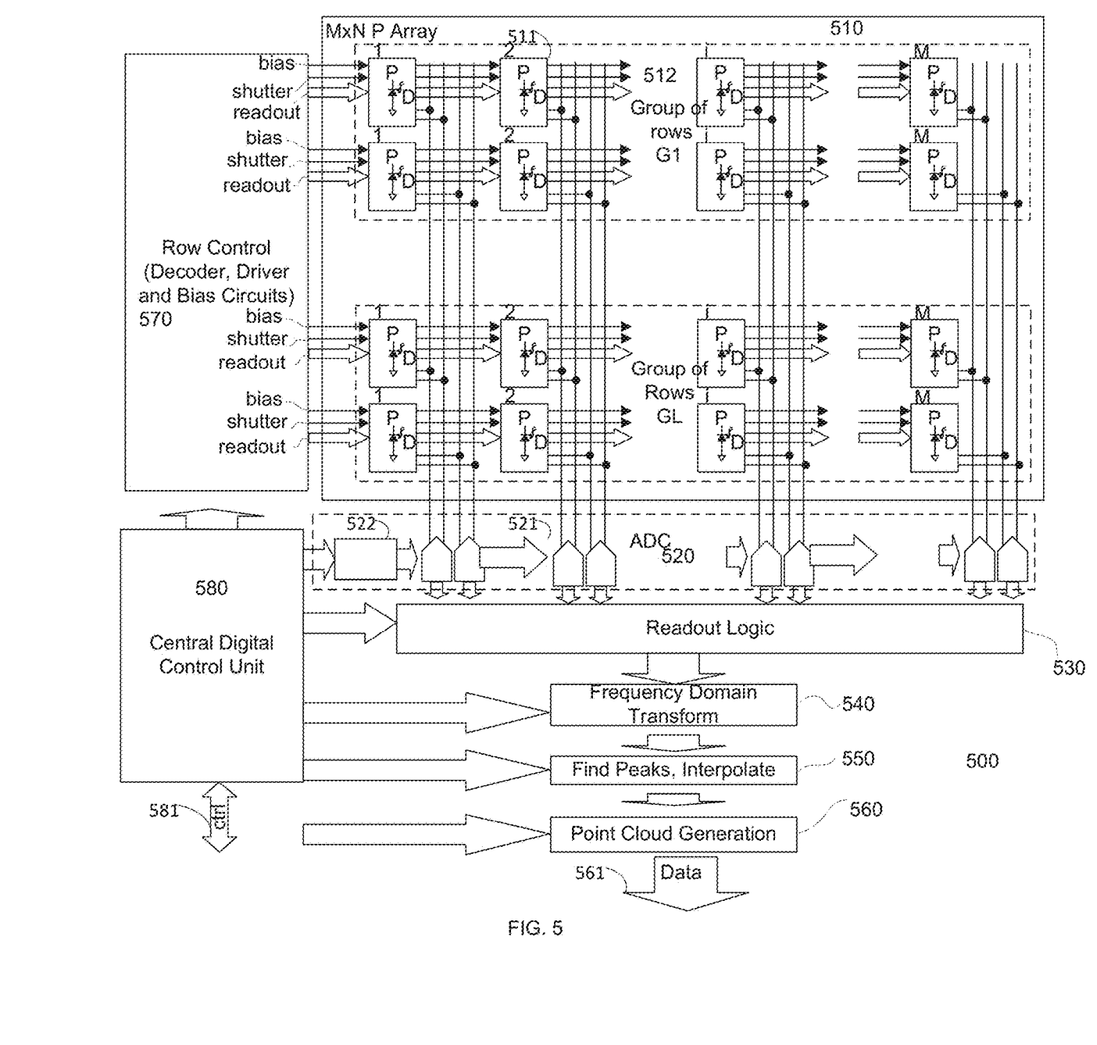
FIG. 5 is an example of some parts of the a LIDAR system.

The imager is built around an array of M×N pixels 510 that are connected in groups of rows 512 each such group containing one or more rows of M individual pixels 511.

Each group of rows 510 is read out at one time by the ADC block 520 that contains a large number of parallel ADC-s 521 and their common circuitry 522. Readout in groups of rows offers higher throughput than reading row by row and is needed to achieve the speed required by the need to correctly sample the waveform.

The ADC outputs feed the readout logic 530 that basically routes the data to the signal processing pipe formed by the frequency domain transform block 540 (that can be an FFT engine or other similar block, peak detection and interpolation block 550 that can implement the simple interpolation described above or more sophisticated algorithms (for example wavelet decomposition or PMUSIC (or similar) algorithm and finally the point cloud generation logic 560. The data is output via the dedicated data interface 561.

The control and bias signals required by the pixels, including the fast shutter chirps are generated by the row control circuits 570.

The entire operation of the imager is orchestrated by the central digital control unit 580 that communicates to the outside world via the control interface 581.

Figure 6:
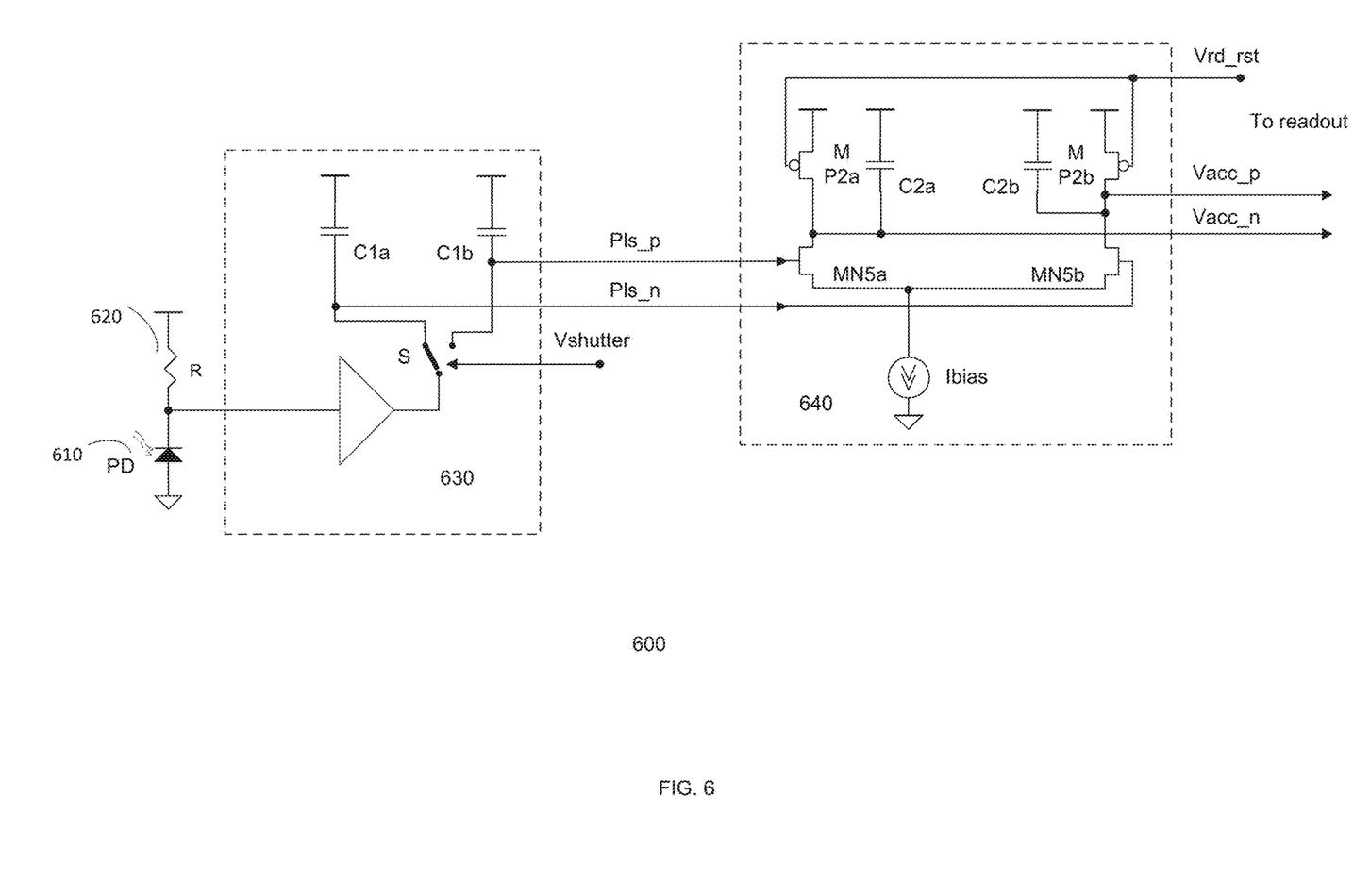
FIG. 6 is an example of a pixel.

The simplified schematics of a possible pixel implementation is shown in FIG. 6. The photodiodes (610) can be implemented on the same wafer with the rest of the circuits but the preferred implementation would have them on a different wafer (for example using SiGe so as to permit better operation in IR spectrum). The photodiodes are fed by a bias circuit (620) shown here as a simple resistor (but other biasing schemes are possible). The photocurrent is amplified by a first dynamic amplifier stage (630) that channels the output as dictated by the shutter signal. The output can be single ended but there is a significant advantage (in terms of noise and sensitivity) for using a differential output as drawn here. The pulsed output signals Pls_p and Pls_n are passed to a second stage (640) that performs the integration of the signal. It can be thought of as implementation of the LPF element in the signal flow described in FIG. 3.

Figure 7:
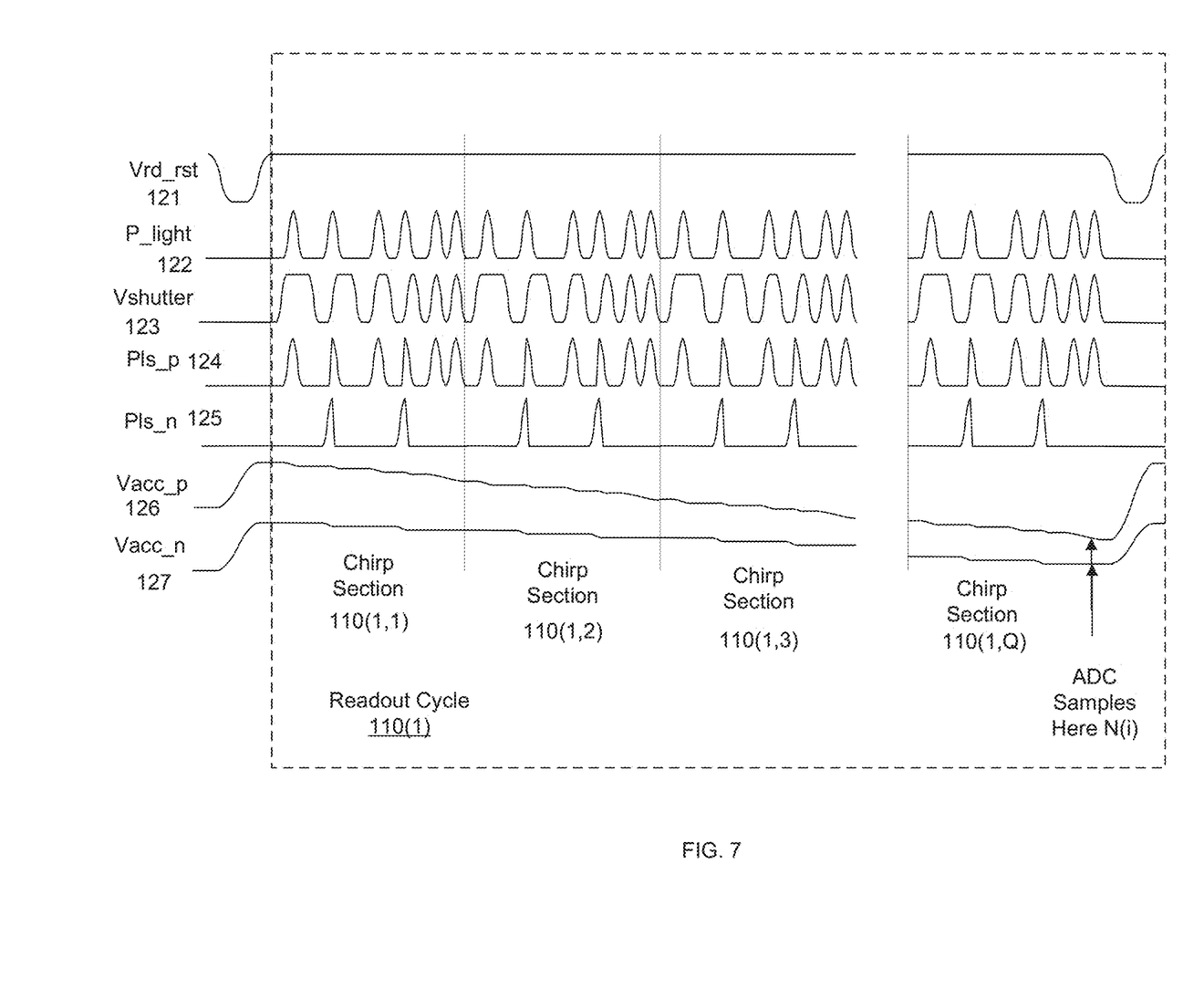
FIG. 7 is an example of waveforms related to the operation of a LIDAR system.

The waveforms (Vrd_rst 121, Vlight 122, Vshutter 123, Pls_p 124, Pls_n 125, Vacc_p 126 and Vacc_n 127) associated with the operation of the pixel are shown in FIG. 7.

This figure illustrates Q chirp sections 110(1,1)-110(1, Q)—that are Q reception periods during which reflections from transmissions during Q transmission periods are executed. Q is an integer that may exceed ten, fifty, one hundred, and the like. The chirp sections may be referred to as reception periods. The Q chirp sections form a sub-group of reception periods. The corresponding Q transmission periods form a sub-group of transmission periods.

For each readout cycle (corresponding to the sampling of one point on the time domain signal that will be used for spectral analysis) a specific chirp section is repeated several times (for example Q times) until enough signal is accumulated to permit a good enough readout. The number of repetitions basically can be used to control the exposure. Obviously, for each readout cycle only one specific chirp section is to be used.

The sequence of the readout cycle is as follows:
a. Reset the accumulation capacitors C2a, C2b
b. Repeat the chirp section a number of times until enough signal has been accumulated
c. Sample the output signal (pass it to ADC)
d. Reset the accumulation capacitors again to start the next readout cycle.

Figure 8:
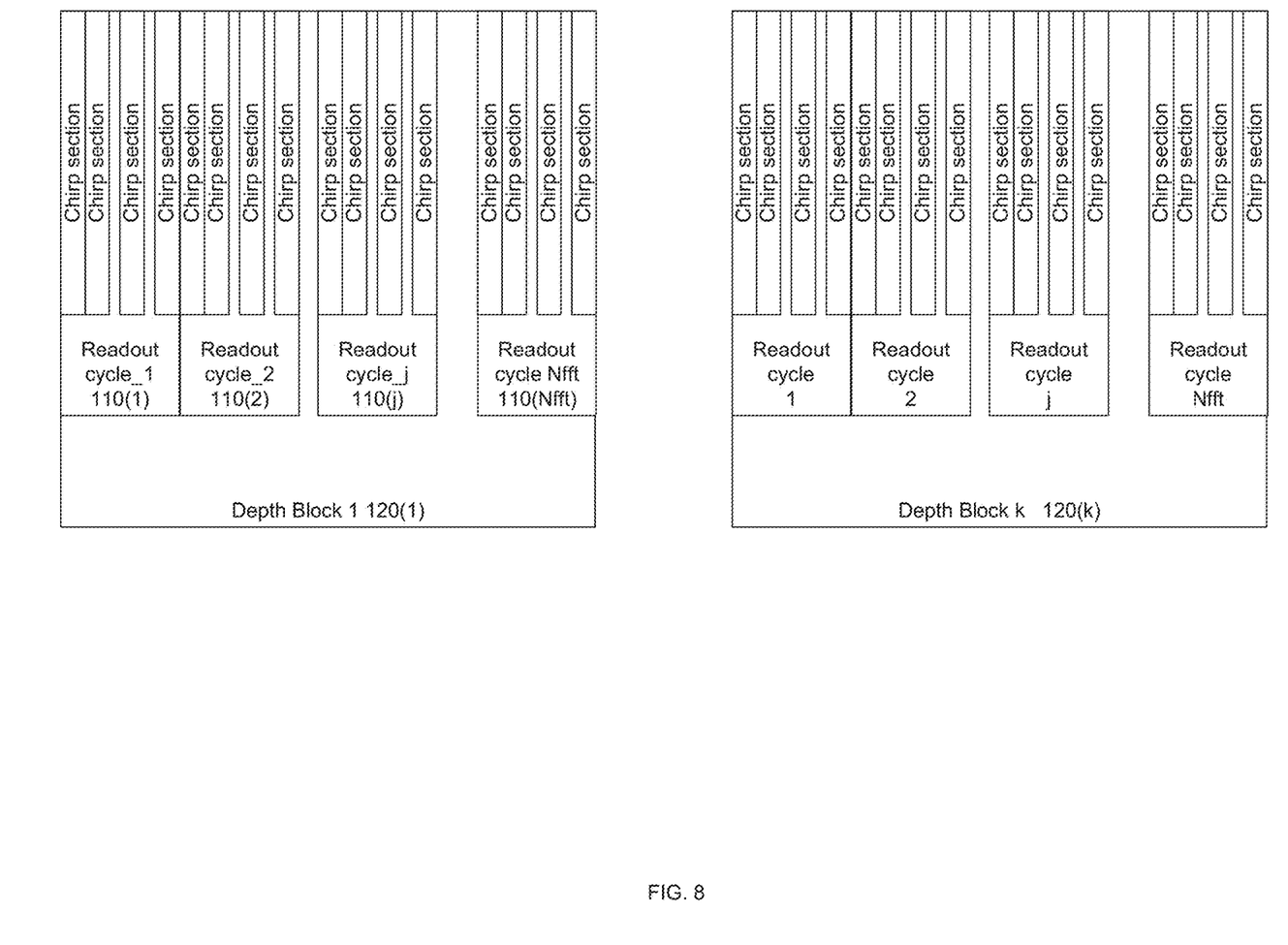
FIG. 8 is an example of a timing diagram.

The higher level timing sequence of the imager is shown in FIG. 8.

A sub-group of reception periods is referred to as a readout cycle. There are $N_{fft}$ sub-groups per a depth block (also referred to as a group of reception periods).

There may be multiple depth blocks (for example first till kt'h depth blocks 120(1)-120(k)).

Depth block 120(1) includes $N_{fft}$ readout cycles 110(1)-110($N_{fft}$), each includes Q chirp sections (Q reception periods).

For generating a depth response, $N_{fft}$ samples need to be recorded for each pixel. The operation is performed in parallel for each group of rows. Each sample is generated by a readout cycle. The readout cycle is an atomic operation but the order of the readout cycles within each depth block can be randomized. Also, readout cycles that correspond to different groups of rows can be executed in pseudo-random sequence (as long as the illuminator and receiver are synchronized and the samples are in the end re-ordered for processing). This permits solutions for coexistence of several LIDAR system-s in the same scene and also solutions for prioritizing regions of interest of the scene.

The Q repetitions are needed to obtain enough information.

In the decimated chirp signal the distance between two consecutive transmitted pulses has to be longer than the minimum pulse repetition period (1/max repetition rate) of the laser so as to permit operation of the pulsed laser within it's designed limits (avoid overheating).

The transmission and/or reception parameter may provide different tradeoffs of resolution and range.

There are some relationships that define the depth range and resolution. $T_{readout}$ is the readout cycle, $f_{slp}$ is the slope of the chirp (df/dt). The slope $f_{slp}$ we can achieve is limited by the maximum chirp (shutter) frequency. Assuming for simplicity we start the shutter at 0 frequency, $f_{slp}$<=fmax_shutter/($T_{readout}$*NFFT). This then (applying equation (9)) leads to the limit for depth resolution being Dx=c/(2*fmax_shutter) and of course the range is then NFFT*Dx.

Two examples of transmission and/or reception parameter sets are provided below.

A first set of parameters is for a precise short range application (for example AR):
  a. Use a 30 W peak power laser that has a minimum time between pulses of 10 ns (max 100 M pulse/sec)
  b. Chirp signal goes from 0.5 GHz to 13.5 GHz—it means decimation is between 1:5 and 1:135.
  c. Chirp sections are 40 ns long.
  d. To get (a not very good) ~100 electron signal at readout, we need 150 repetitions. of the chirp section for each readout, so readout can take place once each 6 us.
  e. There are 128 FFT samples (so depth range will be 64 times the resolution).
  f. For these settings, the depth range is ~0.7 m and resolution (before interpolation) of 11 mm.
  g. One depth frame needs 128×6 us=768 us per group of rows read out.
  h. For an imager that has 300 rows, this means a frame rate of 1/(300*768e-6)=4.2 frames/second if we read line by line. If we read out 4 lines in parallel, we get 16.8 frames per second.

A second set of parameters is for an automotive LIDAR system type of application can be the following:
  i. A 3 KW peak power laser that has a minimum time between pulses of 100 ns (max pulse/sec) and we also direct it to only 10% of the height of the image
  j. Chirp signal goes from 0.1 GHz to 0.5 GHz—it means decimation is between 1:10 and 1:50
  k. Chirp sections are 400 ns long.
  l. To get (a not very good) ~100 electron signal at readout, we need 2 repetitions of the chirp section for each readout, so readout can take place once each 0.8 us.
  m. Using 256 FFT samples (so depth range will be 128 times the resolution).
  n. For these settings, the depth range is ~48 m and resolution (before interpolation) of 37 cm.
  o. One depth frame needs 256×0.8 us=204.8 us per group of rows read out.
  p. For an imager that has 300 rows, this means a frame rate of 1/(300*204.8e-6)=16 frames/second if we read line by line. If we read out 4 lines in parallel, we get 64 frames per second.

Adaptive Transmission and Reception Parameters

The transmission and/or reception parameter may change over time—to provide different tradeoffs between range and resolution. This provides an adaptive resolution—run a mix of two or more parameter sets as the ones explained above and get high resolution close to the camera (such as a time of flight camera) and relaxed resolution (but longer range) further away. As the atomic unit is what we call readout cycle, we can intertwine the several measurements.

Preventing Saturation of the Sensor.

Due to the reduction in light power of the illuminator that goes with an inverse square law, objects close to the camera will reflect way more light than those far away.

Figure 9:
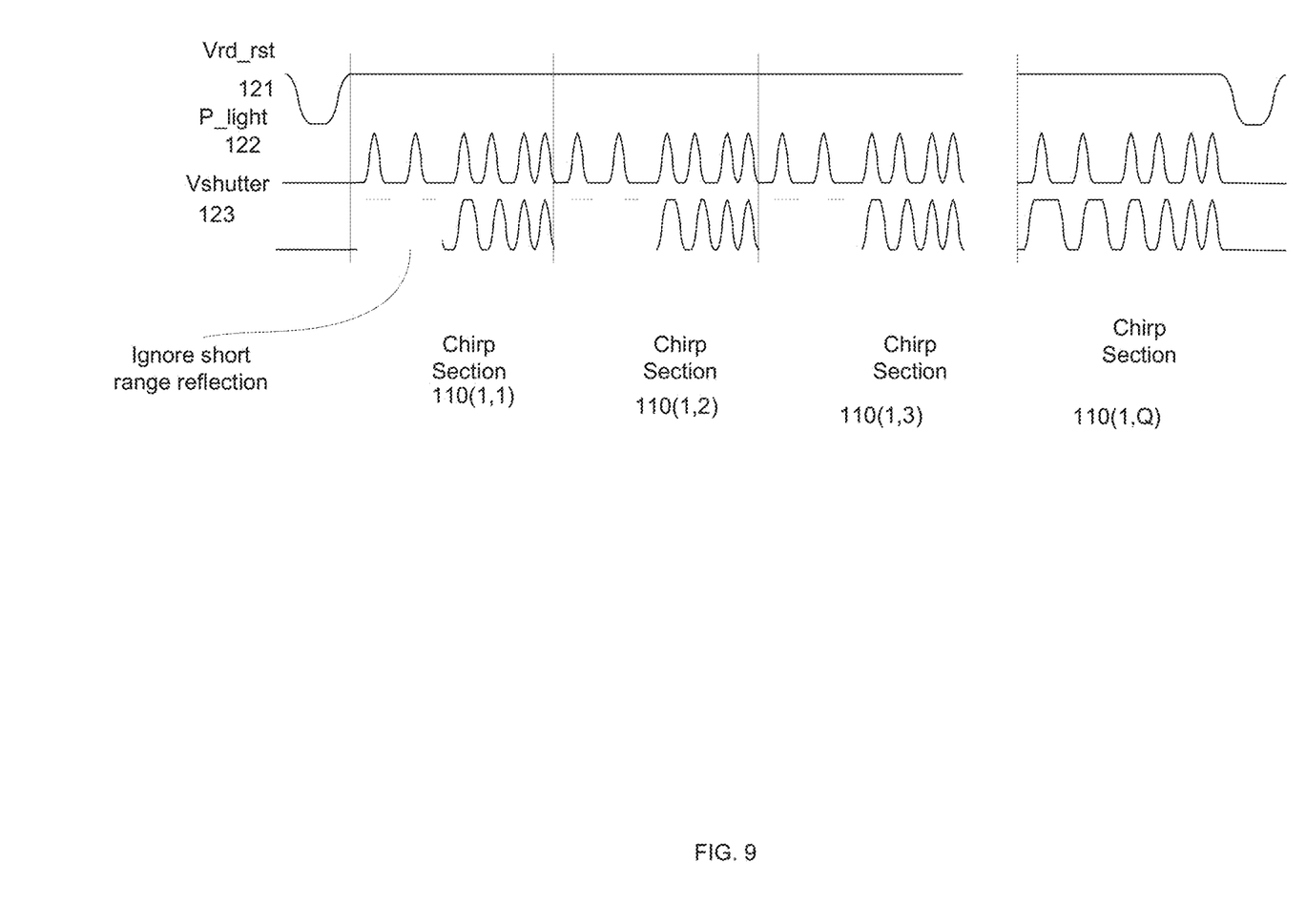
FIG. 9 is an example of waveforms related to the operation of a LIDAR system.

To avoid saturation of the sensor, we can decimate the shutter so as to totally or partially block reflections from objects that are close. See FIG. 9.

Figure 10:
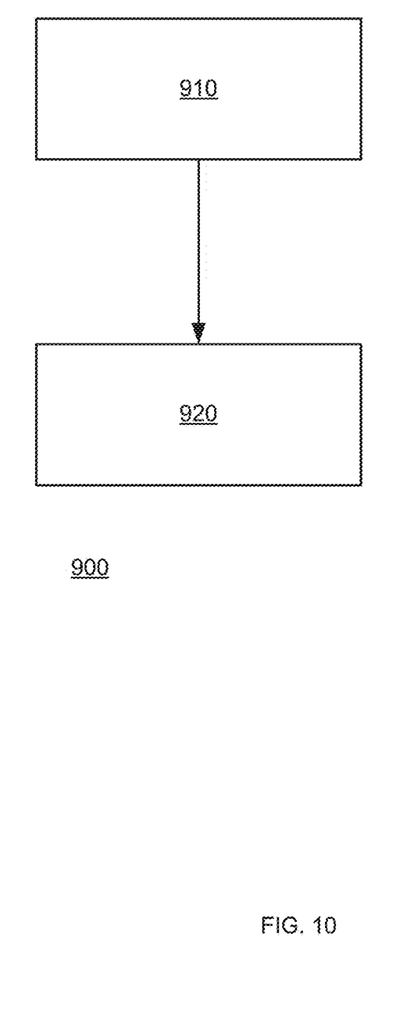
FIG. 10 is an example of a method.

FIG. 10 illustrates an example of method 900.

Method 900 may include detecting one or more targets using a LIDAR system.

Method 900 may start by step 910 of transmitting, during each illumination period of a sub-group of illumination periods, a first plurality of radiation pulses that form a decimated chirp sequence of radiation pulses; the decimated chirp sequence is a sparse representation of a chirp signal.

Step 910 may be followed by step 920 of (a) receiving, by a receiver, during each reception period of a sub-group of reception periods, one or more received light pulses from one or more objects that were illuminated by the one or more radiation pulses transmitted during each illumination period, and (b) converting, by the receiver, the one or more received light pulses to output information; wherein the converting comprises applying a shutter function on intermediate signals, the intermediate signals represent radiation sensed by the multiple radiations sensing elements, wherein the shutter function represents the chirp signal.

The decimated chirp sequence of radiation pulses exhibits a decimation factor that ranges between five and two hundred.

The shutter function may represent a non-decimated version of the chirp signal.

The shutter function may represent a decimated version of the chirp signal, wherein the decimated version of the chirp signal may be synchronized with the decimated chirp sequence.

The decimated chirp sequence may be a decimated version of a continuous pulse radiation chirp.

The decimated chirp sequence may be a decimated version of a stepped pulse radiation chirp.

The chirp signal may be associated with a chirp signal frequency range, wherein each decimated chirp sequence of radiation pulses transmitted during the sub-group of illumination periods may be associated with a same chirp signal frequency sub-range of the chirp signal frequency range.

The decimated chirp sequence of radiation pulses transmitted during different sub-groups of illumination periods may be associated with different chirp signal frequency sub-ranges of the chirp signal frequency range. For example—different readout cycles (of 110(1)-110($N_{fft}$)) may be associated with up to $N_{fft}$ different chirp signal frequency ranges.

The method may include allocating chirp signal frequency sub-ranges associated with consecutive sub-groups of illumination periods so that during each point of time there may be at least a predefined spectral distance transmitted signals of the method and transmitted signals that may be transmitted by another LIDAR system.

The method may include allocating chirp signal frequency sub-ranges associated with consecutive sub-groups of illumination periods based on an allocation of chirp signal frequency sub-ranges transmitted by another LIDAR system.

The decimated chirp sequences of radiation pulses transmitted during different sub-groups of illumination periods may be associated with different combinations of range and resolution.

The decimated chirp sequence of radiation pulses transmitted during different sub-groups of illumination periods may be associated with at least one different parameter out of range, resolution, number of pulses transmitted per sub-groups of illumination period, and shutter function parameter.

The shutter function may represent a partially blocked version of the chirp signal. See, for example, FIG. 9.

The method may include applying the shutter function by blocking some intermediate signals and passing some other intermediate signals within at least a part of reception periods out of the sub-group of reception periods. See, for example FIG. 9.

For at least a part of reception periods out of the sub-group of reception periods, the applying of the shutter function comprises blocking some intermediate signals from short range objects and passing some other intermediate signals from long range objects.

It should be noted that the laser diodes may be replaced by any other light sources.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Any reference to any of the terms "comprise", "comprises", "comprising" "including", "may include" and "includes" may be applied to any of the terms "consists", "consisting", "consisting essentially of". For example—any of the circuits illustrated in any figure may include more components that those illustrated in the figure, only the components illustrated in the figure or substantially only the components illustrate din the figure.

Also for example, in one embodiment, the illustrated examples may be implemented as circuitry located on a single integrated circuit. Alternatively, the examples may be implemented as any number of separate integrated circuits or separate common mode noise chokes interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A chirped illumination LIDAR system comprising:
a transmitter; and
a receiver;
wherein the transmitter comprises a pulsed radiation illuminator that is followed by a beam forming optics;
wherein the transmitter is configured to output, during each illumination period of a sub-group of illumination periods, a first plurality of radiation pulses that form a decimated chirp sequence of radiation pulses; the decimated chirp sequence is a sparse representation of a chirp signal;
wherein the receiver is configured to receive, during each reception period of a sub-group of reception periods, one or more received light pulses from one or more objects that were illuminated by the one or more radiation pulses transmitted during each illumination period;
wherein the receiver comprises multiple radiations sensing elements, multiple shutter circuits, and multiple processing circuits for converting the one or more received light pulses to output information; wherein the multiple shutter circuits are configured to apply a shutter function on intermediate signals, the intermediate signals represent radiation sensed by the multiple radiations sensing elements, wherein the shutter function represents the chirp signal.

2. The chirped illumination LIDAR system according to claim 1 wherein the decimated chirp sequence of radiation pulses exhibits a decimation factor that ranges between five and two hundred.

3. The chirped illumination LIDAR system according to claim 1 wherein the shutter function represents a non-decimated version of the chirp signal.

4. The chirped illumination LIDAR system according to claim 1 wherein the shutter function represents a decimated version of the chirp signal, wherein the decimated version of the chirp signal is synchronized with the decimated chirp sequence.

5. The chirped illumination LIDAR system according to claim 1 wherein the decimated chirp sequence is a decimated version of a continuous pulse radiation chirp.

6. The chirped illumination LIDAR system according to claim 1 wherein the decimated chirp sequence is a decimated version of a stepped pulse radiation chirp.

7. The chirped illumination LIDAR system according to claim 1 wherein the chirp signal is associated with a chirp signal frequency range, wherein each decimated chirp sequence of radiation pulses transmitted during the sub-group of illumination periods are associated with a same chirp signal frequency sub-range of the chirp signal frequency range.

8. The chirped illumination LIDAR system according to claim 7 wherein decimated chirp sequence of radiation pulses transmitted during different sub-groups of illumination periods are associated with different chirp signal frequency sub-ranges of the chirp signal frequency range.

9. The chirped illumination LIDAR system according to claim 7 that is configured to allocate chirp signal frequency sub-ranges associated with consecutive sub-groups of illumination periods so that during each point of time there is at least a predefined spectral distance transmitted signals of the chirped illumination LIDAR system and transmitted signals that are transmitted by another chirped illumination LIDAR system.

10. The chirped illumination LIDAR system according to claim 7 that is configured to allocate chirp signal frequency sub-ranges associated with consecutive sub-groups of illumination periods based on an allocation of chirp signal frequency sub-ranges transmitted by another LIDAR.

11. The chirped illumination LIDAR system according to claim 1 wherein decimated chirp sequences of radiation pulses transmitted during different sub-groups of illumination periods are associated with different combinations of range and resolution.

12. The chirped illumination LIDAR system according to claim 1 wherein decimated chirp sequence of radiation pulses transmitted during different sub-groups of illumination periods are associated with at least one different parameter out of range, resolution, number of pulses transmitted per sub-groups of illumination period, and shutter function parameter.

13. The chirped illumination LIDAR system according to claim 1 wherein the shutter function represents a partially blocked version of the chirp signal.

14. The chirped illumination LIDAR system according to claim 1 wherein the shutter function is configured to block some intermediate signals and pass some other intermediate signals within at least a part of reception periods out of the sub-group of reception periods.

15. The chirped illumination LIDAR system according to claim 1 wherein the shutter function once applied by the receiver, blocks some intermediate signals and pass some other intermediate signals within at least a part of reception periods out of the sub-group of reception periods.

16. The chirped illumination LIDAR system according to claim 1 wherein for at least a part of reception periods out of the sub-group of reception periods, the shutter circuits are configured to apply the shutter function by blocking some intermediate signals from short range objects and passing some other intermediate signals from long range objects.

17. The chirped illumination LIDAR system according to claim 1 wherein the receiver is configured to perform a calibration of the receiver by calculating a processing time associated with at least one of a reception and a transmission of radiation, wherein the calculating is based on (a) a time of reception of a received signal positioned at a known location from the transmitter, on (b) a slope of the decimated chirp sequence of radiation pulses, and (c) a fixed difference between a oscillator of the transmitter and an oscillator of the receiver.

18. A method for detection of objects comprising:
transmitting, during each illumination period of a sub-group of illumination periods, a first plurality of radiation pulses that form a decimated chirp sequence of radiation pulses; the decimated chirp sequence is a sparse representation of a chirp signal;
receiving, by a receiver, during each reception period of a sub-group of reception periods, one or more received light pulses from one or more objects that were illuminated by the one or more radiation pulses transmitted during each illumination period;
converting, by the receiver, the one or more received light pulses to output information; wherein the converting comprises applying a shutter function on intermediate signals, the intermediate signals represent radiation sensed by the multiple radiations sensing elements, wherein the shutter function represents the chirp signal.

19. The method according to claim 18 wherein the chirp signal is associated with a chirp signal frequency range, wherein each decimated chirp sequence of radiation pulses transmitted during the sub-group of illumination periods are associated with a same chirp signal frequency sub-range of the chirp signal frequency range.

20. A non-transitory computer readable medium, that stores instructions for:
transmitting, during each illumination period of a sub-group of illumination periods, a first plurality of radiation pulses that form a decimated chirp sequence of radiation pulses; the decimated chirp sequence is a sparse representation of a chirp signal;
receiving, by a receiver, during each reception period of a sub-group of reception periods, one or more received light pulses from one or more objects that were illuminated by the one or more radiation pulses transmitted during each illumination period;
converting, by the receiver, the one or more received light pulses to output information; wherein the converting comprises applying a shutter function on intermediate signals, the intermediate signals represent radiation sensed by the multiple radiations sensing elements, wherein the shutter function represents the chirp signal.

* * * * *